United States Patent [19]
Popp

[11] 3,794,352
[45] Feb. 26, 1974

[54] FRAME ASSEMBLAGE FOR BICYCLES CONNECTED IN PARALLEL

[76] Inventor: Lester Popp, 12111 W. Good Hope Rd., Milwaukee, Wis. 53224

[22] Filed: Aug. 18, 1971

[21] Appl. No.: 172,753

[52] U.S. Cl. .................................... 280/209, 172/5
[51] Int. Cl. ............................................ B62k 13/06
[58] Field of Search... 280/202, 209; 224/30, 31, 32

[56] References Cited
UNITED STATES PATENTS

| | | | |
|---|---|---|---|
| 557,309 | 3/1896 | Geldowsky | 280/209 |
| 3,592,486 | 7/1971 | Fox | 280/209 |
| 2,248,223 | 7/1941 | Fellman et al. | 280/209 |
| 3,664,683 | 5/1972 | Gobby | 280/202 |
| 750,480 | 1/1904 | McLarty | 280/209 |
| 822,688 | 6/1906 | Nicholas | 280/209 |

OTHER PUBLICATIONS
Popular Science Magazine; Sept. 1956; pages 204 and 205

Primary Examiner—Kenneth H. Betts
Attorney, Agent, or Firm—Andrus, Sceales, Starke & Sawall

[57] ABSTRACT

The disclosure provides for a frame assemblage for connecting or coupling a pair of bicycles in side-by-side or parallel relation. The frame assemblage includes carrier means rigidly connected between the several transversely extending frame elements of the assemblage.

12 Claims, 5 Drawing Figures

INVENTOR.
LESTER G. POPP

BY

Attorneys

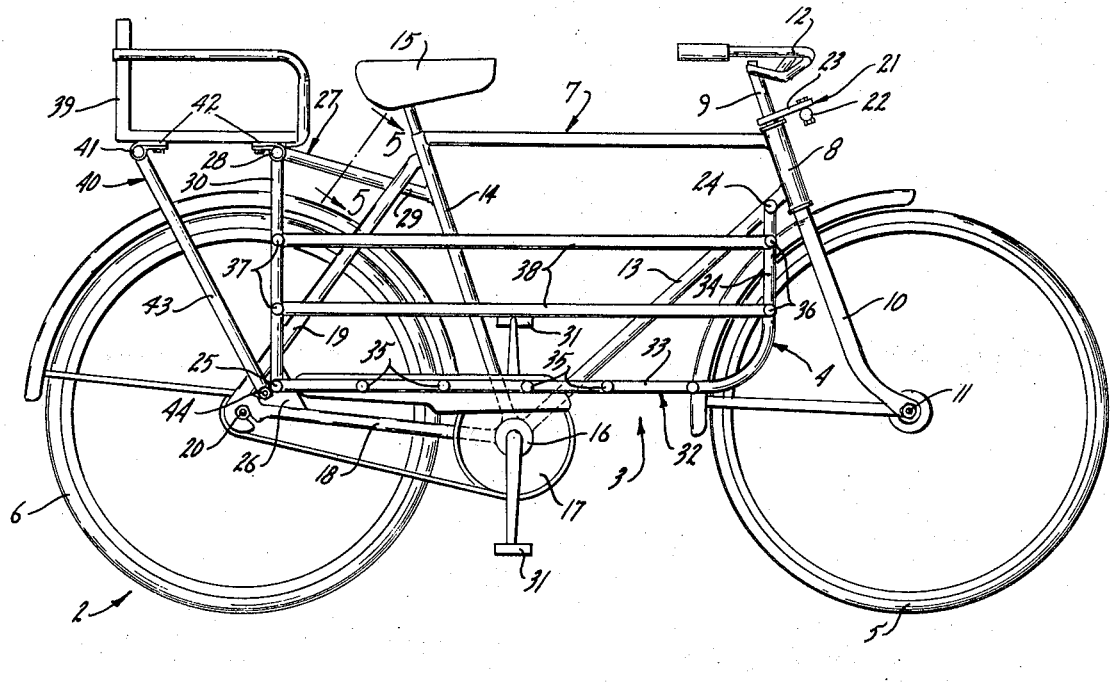

FRAME ASSEMBLAGE FOR BICYCLES CONNECTED IN PARALLEL

BACKGROUND OF THE INVENTION

This invention relates to a frame assemblage for connecting or coupling a pair of bicycles in side-by-side or parallel relation.

Bicycles are growing ever more popular. Their original cost and subsequent maintenance cost are relatively low making them potentially available to a great mass of people. Their use provides an excellent form of exercise and/or diversion and gives rise to virtually no environmental problems.

For certain applications bicycles provided in dual side-by-side or parallel relation are of advantage. Bicycles so connected or coupled provide a very stable vehicle which can be enjoyed even by those who lack confidence in their sense of balance or who for other reasons are not able to side a standard bicycle. The parallel connected bicycles can be useful for certain types of invalided persons who may require supervision and/or assistance so that such a vehicle can serve a rehabilitation function. The sociability afforded by the side-by-side arrangement can make such a vehicle just plain fun to ride whether for couples of the same or opposite sex, and its recreational use may extend to picknicking, touring, and camping among others.

SUMMARY OF THE INVENTION

The frame assemblage of this invention for connecting or coupling a pair of bicycles in side-by-side or parallel relation includes at least a pair of longitudinally spaced, transversely extending frame elements which extend between and rigidly connect substantially alike locations on the adjacently disposed sides of the bicycles disposed in parallel relation. The assemblage further includes a generally U-shaped frame element having a transversely extending portion intermediate a pair of transversely spaced, generally parallel legs. The transverse portion of the U-shaped frame element extends above the rear wheels between the parallel bicycles with the respective legs disposed generally in the vertical plane of the centerlines of the corresponding bicycles. The ends of the parallel legs remote from the transverse portion of the U-shaped frame element are rigidly connected at substantially alike locations on the respective bicycles. The frame assemblage also includes carrier means rigidly connected between the several frame elements of the assemblage. The frame assemblage generally precludes relative movement in a transverse direction between the parallel bicycles but permits some relative movement vertically and longitudinally between the bicycles in order to substantially retain the feel and riding qualities of a standard bicycle.

DESCRIPTION OF THE DRAWING FIGURES

The drawings furnished herewith illustrate the best mode for carrying out the invention as presently contemplated and set forth hereinafter.

In the drawings:

FIG. 3 is a sectional view taken generally on line 3—3 of FIG. 2, but shows the passenger seat;

FIG. 4 is a detail perspective view of the frame assemblage including the basket-like carrier for the bicycles connected in parallel according to this invention; and FIG. 5 is an enlarged sectional view taken generally on line 5—5 of FIG. 3.

DESCRIPTION OF THE ILLUSTRATED EMBODIMENTS

Figure 1:
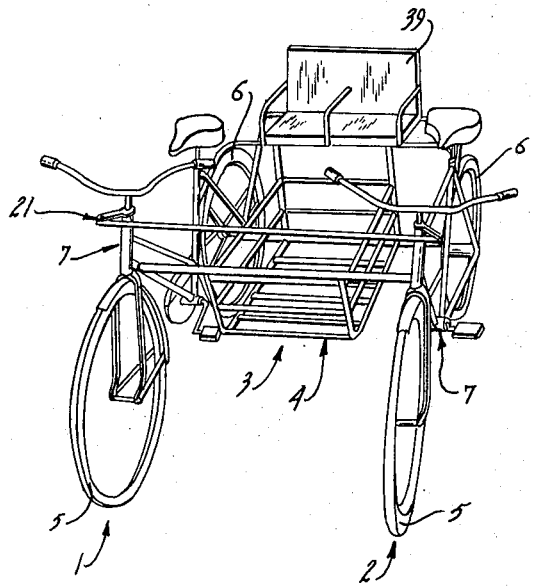
FIG. 1 is a perspective view of bicycles connected in parallel according to the present invention.

Referring to the drawings, the bicycles 1 and 2 are connected in parallel by an intervening frame assemblage 3 which includes a basket-like carrier 4. While the bicycles 1 and 2 are generally standard girl's and boy's bicycles, respectively, to provide a "his and hers" arrangement, both of the parallel connected bicycles could be of the boy's type or girl's type, if preferred.

The generally standard bicycles 1 and 2 each include front and rear wheels 5 and 6, respectively, which support a frame unit 7. At the front end of the bicycles 1 and 2, the frame unit 7 includes the bearing sleeve 8 for pivotally housing a steering post 9 which carries the front fork 10 at the lower end thereof for connection to the front wheel axle 11 and the handle bars 12 at the upper end thereof for pivoting the post and front wheel for steering. The frame unit 7 further includes a declining brace 13 extending rearwardly from the bearing sleeve 8 and a seat post 14 mounting a seat 15 at the upper end thereof. The brace 13 and seat post 14 generally meet at the pivot housing 16 for the drive sprocket 17 disposed intermediate wheels 5 and 6. A forked strut 18 extends rearwardly from the sprocket pivot housing 16 and joins the lower end of the rear fork 19 for connection to the rear wheel axle 20. The upper end of the rear fork 19 is connected to the upper end of the seat post 14 in the standard arrangement.

The bicycles 1 and 2, connected in parallel in a manner hereinafter described, steer in unison as provided by the steering linkage 21. The linkage 21 includes the transversely extending rigid link 22 which exceeds in length the centerline distance between the bicycles 1 and 2. The respective ends of link 22 are universally connected to the corresponding arms 23 fixedly secured to the steering posts 9 of the respective bicycles. The steering linkage 21 is designed to take into account the fact that the inner bicycle travels on a curve of lesser radius than does the outer bicycle when negotiating a turn and so provides for greater angular deflection for steering for the inner bicycle.

The frame assemblage 3 for connecting the bicycles 1 and 2 in side-by-side or parallel arrangement includes a pair of transversely extending tubular frame elements 24 and 25. The frame element 24 is disposed forwardly and is rigidly secured by welding or other suitable means to the braces 13 of the respective bicycles 1 and 2 generally immediately to the rear of the bearing sleeve 8. The respective ends of the reardwardly disposed frame element 25 is rigidly secured to the respective bicycles 1 and 2 generally immediately above and forward of the rear axle 20. A gusset plate 26 is rigidly secured in the angle formed between the forked strut 18 and rear fork 19 on the adjacently disposed sides of bicycles 1 and 2 for rigid connection of the respective ends of frame element 25.

Frame assemblage 3 further includes a generally U-shaped tubular frame element 27 having a transversely extending portion 28 intermediate the longitudinally extending generally parallel legs 29. The transverse portion 28 of frame element 27 is disposed above the rear wheels 6 of bicycles 1 and 2 and is generally vertically aligned with frame element 25, and a pair of transversely spaced, vertically upright struts 30 extend between and rigidly connect the frame elements 25 and 27. The respective parallel legs 29 of frame element 27 extend forwardly and downwardly from transverse portion 28 and pass between the forks of the corresponding rear fork 19 for rigid securement to the corresponding seat post 14 beneath the rear fork to seat post connection. So disposed frame element 27 is in the nature of a torsion spring which permits some degree of relative movement between the bicycles 1 and 2 as may result when one bicycle negotiates a bump or depression in the road.

Figure 2:
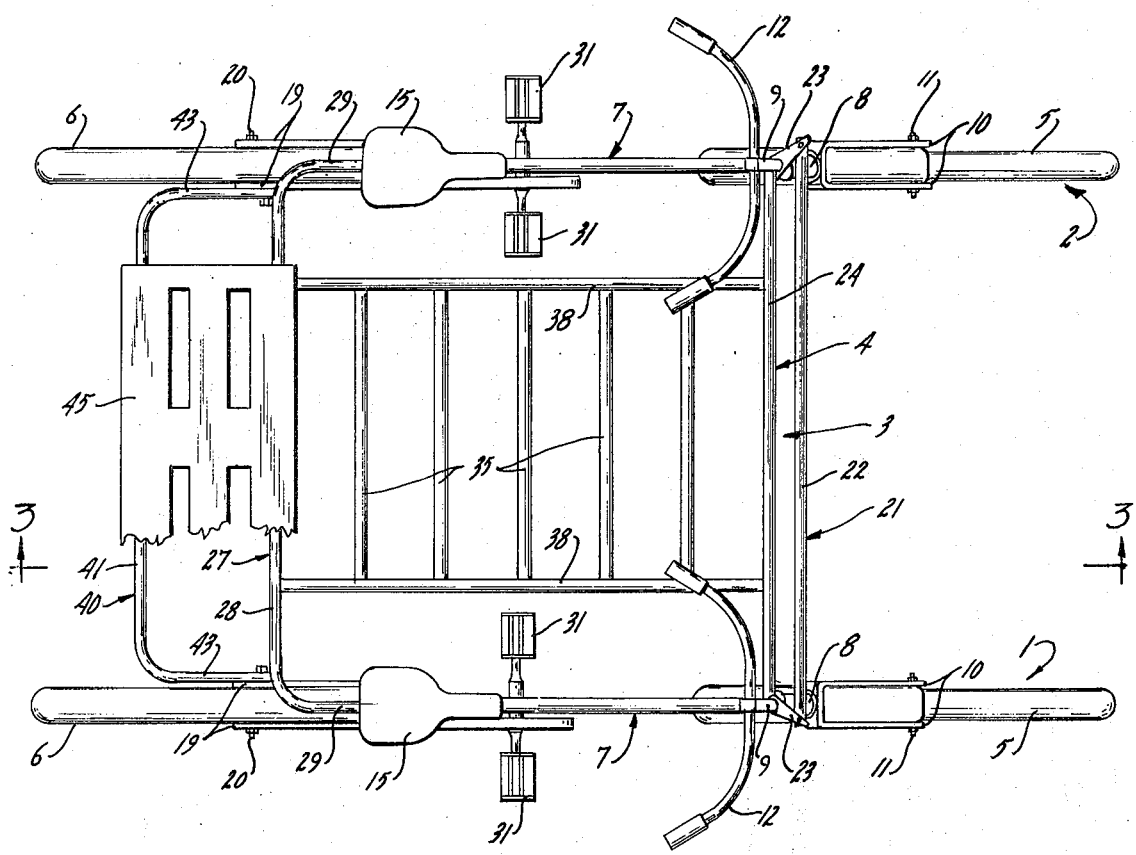
FIG. 2 is a top plan view of the parallel connected bicycles of FIG. 1, but in place of the passenger seat shows a flat bed luggage rack.

The frame assemblage 3 joining the bicycles 1 and 2 in side-by-side or parallel relation also includes the basket-like carrier 4. The carrier 4 is fabricated from tubular or bar stock secured together by welding or other suitable means. As shown in FIGS. 2 through 4, the basket-like carrier 4 extends longitudinally between the frame elements 24 and 25 transversely between the frame struts 30 which are spaced from the respective bicycles 1 and 2 a distance providing adequate clearance for operation of the foot pedals 31. The bottom and front of the carrier 4 are generally established by a pair of transversely spaced angle rods 32 which in assembled relation have a generally horizontally disposed portion 33 forming the side edges for the bottom and a generally vertically disposed portion 34 forming the side edges at the front. Rearwardly the horizontal portions 33 of the respective angle rods 32 are secured to the rear frame element 25 at the location of the frame struts 30. Forwardly the vertical portions 34 of angle rods 32 are secured to the forward frame element 24.

A plurality of longitudinally spaced cross members 35 extend transversely between the horizontal portions 33 of rods 32 to form the bottom for carrier 4. A pair of vertically spaced cross rails 36 extend between the vertical portions 34 of the spaced angle rods 32 to provide confinement at the front of the basket-like carrier 4. At the rear of carrier 4, confinement is provided by the vertically spaced cross rails 37 which extend transversely between the frame struts 30. Confinement along the respective sides of the carrier 4 are provided by the vertically spaced side rails 38 which extend longitudinally from the vertical portions 34 of the angle rods 32 to the corresponding frame struts 30.

The bicycles 1 and 2 connected in side-by-side or parallel relation by the frame assemblage 3 including carrier 4 provides an excellent recreational vehicle for any couple desirous of taking their pleasure outdoors. The resultant vehicle is very stable, and the side-by-side arrangement certainly promotes sociability. For a couple, the resultant vehicle is ideal for a camping trip with the carrier 4 providing stowage for the camping gear. In the event there is some concern relative to possible loss from the basket-like carrier 4 due to the spacing between cross members 35, cross rails 36 and 37 and side rails 38, a suitable container-like liner, not shown, may be disposed in the carrier.

Even for "young marrieds" desirous of taking one or two small children along, seating 39 can be readily provided between the bicycles 1 and 2. As perhaps best shown in FIG. 3, seating 39 can be supported between the transversely extending portion 28 of the U-shaped frame element 27 and the generally U-shaped bracing member 40 which has a transversely extending portion 41 rearwardly of and generally horizontally aligned with portion 28 of the frame element 27. Suitable clamps 42 are utilized to secure the seating 39 to the transverse portions 28 and 41 of the frame element 27 and bracing member 40 respectively. The U-shaped bracing member 40 further includes the spaced and parallel bracing strut portions 43 which extend forwardly and downwardly for securement by bolts 44 or the like to the corresponding gusset plates 26 on the respective bicycles 1 and 2.

For those having no need for seating 39 but are desirous for greater stowage area, a flat bed luggage rack 45 as shown in FIG. 2 may replace the seating between the frame element 27 and bracing member 40. Any extra load supported by seating 39 or rack 45 is disposed over the rear axle 20 of the respective bicycles 1 and 2 and therefore will have relatively little effect on the stability and steering capability of the resultant vehicle.

Various modes for carrying out the invention are contemplated as being within the scope of the following claims particularly pointing out and distinctly claiming the subject matter which is regarded as the invention.

I claim:

1. In a frame assemblage for connecting a pair of bicycles in a side-by-side or parallel relation, at least a pair of longitudinally spaced, transversely extending frame elements for extending between and making rigid connection to the adjacently disposed sides of a pair of bicycles disposed in parallel relation, a generally U-shaped torsion spring frame element having a transversely extending portion intermediate a pair of transversely spaced, generally parallel legs, said transverse portion of the U-shaped torsion spring frame element being disposed to extend above the rear wheels and between the parallel bicycles with the respective legs disposed generally in the vertical plane of the centerlines of the bicycles for making rigid connections between the remote ends of said legs and the corresponding bicycles, and carrier means constituting an integral part of the frame assemblage and extending between the several frame elements.

2. The invention as set forth in claim 1 wherein one of the longitudinally spaced, transversely extending frame elements is connected to the frame of the respective bicycles adjacent to the steering bearing sleeves and another of the longitudinally spaced, transversely extending frame elements is connected to the respective bicycles adjacent to the rear axles, and the carrier means extends between said one and another by the longitudinally spaced, transversely extending frame elements.

3. The invention as set forth in claim 2 wherein the transversely extending portion of the U-shaped torsion spring frame element is generally vertically aligned with the frame element connected to the respective bicycles adjacent to the rear axles, and a plurality of vertical struts extend between and connect the transverse portion of the U-shaped torsion spring frame element and the frame element connected to the respective bicycles adjacent to the rear axles.

4. In a frame assemblage for connecting a pair of bicycles for operation in side-by-side or parallel relation, said bicycles each having a frame unit supported by front and rear wheels at corresponding axles with the front wheel being steerable by pivoting movements of a steering post within a steering bearing sleeve, a first transversely extending frame element connecting the frame units of the respective bicycles adjacent to the steering bearing sleeves, a second transversely extending frame element connecting the frame units of the respective bicycles adjacent to the rear axles, a generally U-shaped torsion spring frame element having a transversely extending portion intermediate a pair of transversely spaced legs, said transverse portion of the U-shaped torsion spring element being disposed to extend at a height above the rear wheels and substantially in the vertical plane of the second frame element with the spaced legs of the U-shaped torsion spring frame element being connected to the frame units of the corresponding bicycles, a plurality of vertical struts extending between and connecting the transverse portion of the U-shaped torsion spring frame element and the second frame element, and load bearing means disposed between the bicycles, said load bearing means being supported at least in part on the U-shaped torsion spring frame element for disposition generally over the axis of the rear axles of the bicycles.

5. The invention as set forth in claim 4 wherein the transverse portion of the U-shaped torsion spring frame element comprises the front support for the load bearing means, and an added support member connected to the frame units of the respective bicycles provides the rear support for the load bearing means.

6. The invention as set forth in claim 5 wherein the load bearing means comprises a passenger seat.

7. The invention as set forth in claim 5 wherein the load bearing means comprises a luggage rack.

8. The invention as set forth in claim 7 wherein the frame assemblage connecting the parallel bicycles includes an integral carrier means which extends longitudinally between the first and second frame elements.

9. In a frame assemblage for connecting a pair of bicycles for operation in side-by-side or parallel relation, said bicycles each having a generally standard frame unit supported by front and rear wheels at corresponding axles with the front wheel being steerable by pivoting movements of a steering post within a steering bearing sleeve, a first transversely extending frame element connecting the frame units of the respective bicycles adjacent to the steering bearing sleeves, a second transversely extending frame element connecting the frame units of the respective bicycles adjacent to the rear axles, and a generally U-shaped torsion spring frame element having a transversely extending portion intermediate a pair of transversely spaced generally parallel legs, said transverse portion of the U-shaped torsion spring frame element being disposed to extend above the rear wheels and between the respective bicycles with the respective legs disposed generally in the vertical planes of the centerlines of the parallel bicycles and the remote ends of said legs being connected to the frame units of the corresponding bicycles, the transverse portion of the U-shaped torsion spring frame element being further generally disposed in the vertical plane of the second frame element, and a pair of transversely spaced vertical struts extending between and connecting the transverse portion of the U-shaped torsion spring frame element and the second frame element, and carrier means, said carrier means extending longitudinally between the first and second frame elements and transversely between the vertical struts.

10. The invention as set forth in claim 9 wherein the carrier means comprise a basket-like carrier formed of framing members secured together by welding.

11. The invention as set forth in claim 10 wherein the framing members forming the basket-like carrier include a pair of transversely spaced generally parallel angle rods having a horizontally disposed portion and a vertically disposed portion, the horizontally disposed portion of said angle rods being connected to the second frame element at the location of the vertical struts and the vertically disposed portion of said angle rods being connected to the first frame element, a plurality of longitudinally spaced cross bars extending transversely between and connecting the horizontally disposed portions of the angle rods to form a bottom for said carrier, a plurality of vertically spaced cross rails extending transversely between and connecting the vertically disposed portions of the angle rods to form a front end confinement for the carrier, a plurality of vertically spaced cross rails extending transversely between and connecting the vertical struts to form a rear end confinement for the carrier, and a plurality of vertically spaced side rails extending longitudinally between and connecting the respective vertical struts and the corresponding vertically extending portions of the respective angle rods to provide confinement along the respective sides for the carrier.

12. In a frame assemblage for connect-ing a pair of bicycles for operation in side-by-side or parallel relation, said bicycles each having a frame unit supported by front and rear wheels at corresponding axles with the front wheel being steerable by pivoting movements of a steering post within a steering bearing sleeve, at least a pair of longitudinally spaced transversely extending frame elements extending between and rigidly connecting the parallel bicycles adjacent to their steering posts and adjacent to their rear axles, and basket-like carrier means extending longitudinally between and connecting said frame elements and forming an integral part of the frame assemblage, said carrier means projecting upwardly with respect to the frame element connecting adjacent to the rear axis of the bicycles and downwardly with respect to the frame element connecting adjacent to the steering posts of the bicycles.

* * * * *

UNITED STATES PATENT OFFICE
CERTIFICATE OF CORRECTION

Patent No. 3,794,352            Dated February 26, 1974

Inventor(s) Lester G. Popp

It is certified that error appears in the above-identified patent and that said Letters Patent are hereby corrected as shown below:

Col. 1, line 20, cancel "side" and substitute therefor ---ride---

Col. 5, line 11, after "spring" insert ---frame--- line 34, cancel "7" and substitute therefor ---5---

Signed and sealed this 22nd day of October 1974.

(SEAL)
Attest:

McCOY M. GIBSON JR.            C. MARSHALL DANN
Attesting Officer             Commissioner of Patents